(12) United States Patent
Tanaka

(10) Patent No.: US 8,145,017 B2
(45) Date of Patent: Mar. 27, 2012

(54) OPTICAL MODULE

(75) Inventor: Hiromasa Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 351 days.

(21) Appl. No.: 12/588,041

(22) Filed: Oct. 1, 2009

(65) Prior Publication Data

US 2010/0086261 A1 Apr. 8, 2010

(30) Foreign Application Priority Data

Oct. 3, 2008 (JP) ................................ 2008-258420

(51) Int. Cl.
*G02B 6/12* (2006.01)
*G02B 6/26* (2006.01)
*G02B 6/42* (2006.01)
(52) U.S. Cl. ........................................... 385/14; 385/32
(58) Field of Classification Search .................... 385/14, 385/32
See application file for complete search history.

(56) References Cited

U.S. PATENT DOCUMENTS

| | | | |
|---|---|---|---|
| 6,385,223 B1 | 5/2002 | Kurihara | |
| 6,937,628 B2 * | 8/2005 | Tatsuno et al. | 372/19 |
| 2002/0126386 A1 * | 9/2002 | Jordan et al. | 359/577 |
| 2005/0051712 A1 | 3/2005 | Komiyama | |
| 2009/0059973 A1 * | 3/2009 | Suzuki | 372/20 |

FOREIGN PATENT DOCUMENTS

| | | |
|---|---|---|
| JP | 7-235566 | 9/1995 |
| JP | 2000-231041 | 8/2000 |
| JP | 2005-85904 | 3/2005 |
| JP | 2007-115933 | 5/2007 |
| WO | WO 2005/106546 A2 | 11/2005 |

OTHER PUBLICATIONS

Daniel Mahgerefteh, et al., "Tunable Chirp Managed Laser", IEEE Photonics Technology Letters, vol. 20, No. 2, pp. 108-110, 2008.
Raj Batra, et al., Integrable Tunable Transmitter Assembly White Paper, OIF, 2004.

* cited by examiner

*Primary Examiner* — Rhonda Peace
(74) *Attorney, Agent, or Firm* — McGinn IP Law Group, PLLC

(57) ABSTRACT

In an optical module, a waveguide unit has a wavelength filter having a ring resonator structure. A semiconductor laser is connected to the input terminal of an input waveguide. A semiconductor Mach-Zehnder modulator is connected to the output terminal of an output waveguide. A first photodiode is connected to the output terminal of a branch waveguide. A second photodiode is connected to the through port of the input waveguide. A temperature adjustment unit adjusts the temperature of the waveguide unit. A laser output controller is connected to the first photodiode and the semiconductor laser to control an output from the semiconductor laser based on an output signal from the first photodiode. A temperature adjustment controller is connected to the second photodiode and the temperature adjustment unit to control the temperature adjustment operation of the temperature adjustment unit based on an output signal from the second photodiode.

7 Claims, 3 Drawing Sheets

OPTICAL MODULE

This application is based upon and claims the benefit of priority from Japanese patent application No. 2008-258420, filed on Oct. 3, 2008, the disclosure of which is incorporated herein in its entirety by reference.

BACKGROUND OF THE INVENTION

The present invention relates to an optical module which uses a semiconductor laser as a light source and includes a wavelength locker and a modulator.

Recent progress of technologies is stimulating commercialization of an optical module which integrates a modulator and a wavelength locker together with a semiconductor laser and serves as a light source. Such an optical module is described in Japanese Patent Laid-Open No. 2007-115933 (reference 1), Japanese Patent Laid-Open No. 2005-085904 (reference 2), Daniel Mahgerefteh, et al., "Tunable Chirp Managed Laser", IEEE PHOTONICS TECHNOLOGY LETTERS, VOL. 20, NO. 2, pp. 108-110, 2008 (reference 3), and Raj Batra, et al., "Integrable Tunable Transmitter Assembly White Paper", OIF. (reference 4). For example, an optical semiconductor module described in reference 1 incorporates a semiconductor optical modulator and uses three lenses for optical coupling. An optical module described in reference 2 incorporates an etalon filter and controls the output wavelength of an LD element. This optical module uses a lens as an optical system for optical coupling.

In all the optical modules, however, a laser is optically coupled with a semiconductor modulator via a lens, resulting in a bulky optical system and a large coupling loss. To the contrary, International Publication No. WO 2005/106546 (reference 5) discloses a technique of optically coupling a laser source with an internal optical filter or optical modulator using a waveguide.

In the technique disclosed in reference 5, a ring oscillator (resonator) extracts light with a predetermined wavelength from light emitted by the laser source, and a photodetector detects the intensity of the extracted light. The oscillation wavelength of the laser source is controlled such that the signal strength to be detected by the photodetector is maximized. This makes it difficult to increase the strength of the optical signal to be output to the modulator. In addition, according to the technique of reference 5, the output of light emitted by the laser source changes upon temperature control to control the oscillation wavelength.

SUMMARY OF THE INVENTION

An exemplary object of the invention is to solve the above-described problems and provide an optical module capable of stably outputting an optical signal having a higher strength in a low coupling loss state.

An optical module according to an exemplary aspect of the invention includes a waveguide unit including an input waveguide, a circular waveguide, an output waveguide, and a branch waveguide branched from an input terminal of the input waveguide, the input waveguide, the circular waveguide, and the output waveguide forming a wavelength filter having a ring resonator structure, a semiconductor laser mounted on the waveguide unit and connected to the input terminal of the input waveguide, a semiconductor Mach-Zehnder modulator mounted on the waveguide unit and connected to an output terminal of the output waveguide, a first photodiode mounted on the waveguide unit and connected to an output terminal of the branch waveguide, a second photodiode mounted on the waveguide unit and connected to a through port of the input waveguide, a temperature adjustment unit which adjusts a temperature of the waveguide unit, a laser output controller which is connected to the first photodiode and the semiconductor laser to control an output from the semiconductor laser based on an output signal from the first photodiode, and a temperature adjustment controller which is connected to the second photodiode and the temperature adjustment unit to control a temperature adjustment operation of the temperature adjustment unit based on an output signal from the second photodiode.

EXEMPLARY EMBODIMENT

Figure 1:
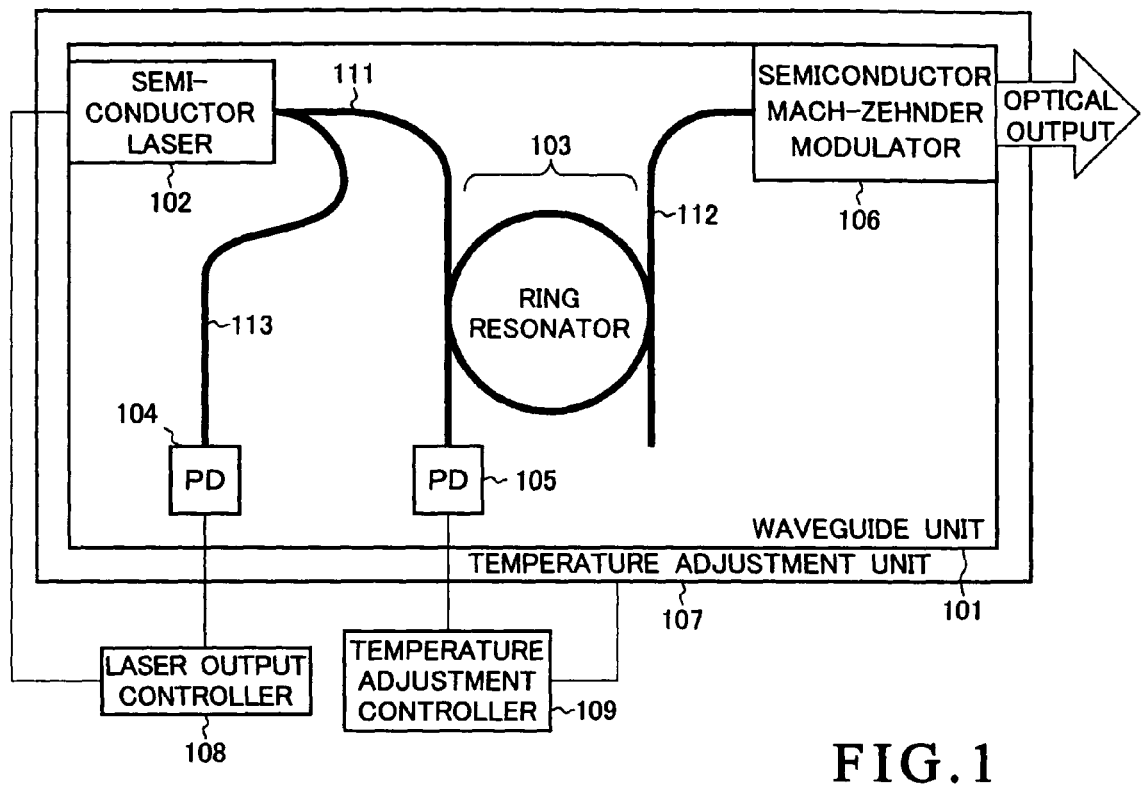
FIG. 1 is a plan view showing the arrangement of an optical module according to an exemplary embodiment of the present invention.

An exemplary embodiment of the present invention will now be described with reference to the accompanying drawings. FIG. 1 shows the arrangement of an optical module according to an exemplary embodiment of the present invention. This optical module includes a waveguide unit 101, a semiconductor laser 102, a photodiode (PD, first photodiode) 104, a photodiode (PD, second photodiode) 105, a semiconductor Mach-Zehnder modulator 106, a temperature adjustment unit 107, a laser output controller (laser output control means) 108, and a temperature adjustment controller (temperature adjustment control means) 109. An input waveguide 111, a ring resonator 103, an output waveguide 112, and a branch waveguide 113 are formed on the waveguide unit 101.

The waveguide unit 101 includes a PLC (Planar Lightwave Circuit) which is formed from a well-known high index contrast waveguide made of a silicon core. This is formed from, e.g., an SOI (Silicon On Insulator) substrate. An SOI layer is processed to form the above-described silicon core. A buried insulating layer that is the underlayer of the SOI layer serves as a lower cladding layer. The waveguide unit 101 has, on it, the input waveguide 111, the ring resonator 103 formed from a circular waveguide, the output waveguide 112, and the branch waveguide 113 as waveguides (PLC) each made of a silicon core formed in the above-described way. The input waveguide 111, the ring resonator 103, and the output waveguide 112 form a wavelength filter having a ring resonator structure.

In the thus constituted waveguides, the semiconductor laser 102 is connected to the input port of the input waveguide 111. The semiconductor laser 102 is an edge emitting laser having a waveguide type resonator structure and is formed from, e.g., a DFB laser or a DBR laser. On the other hand, the semiconductor Mach-Zehnder modulator 106 is connected to the output side (drop port) of the output waveguide 112 on the opposite side of the ring resonator 103. The semiconductor Mach-Zehnder modulator 106 has a waveguide structure formed by, e.g., stacking compound semiconductors, like the semiconductor laser 102.

The branch waveguide 113 is also connected to the semiconductor laser 102 as well as the input port of the input waveguide 111. Directional couplers are formed at the branch portions of the input waveguide 111 and the output waveguide 112. The photodiode 104 is connected to the output terminal of the branch waveguide 113. The photodiode 105 is connected to the through port of the input waveguide 111. The waveguide unit 101 is arranged on the temperature adjustment unit 107 which adjusts the temperature of the waveguide unit 101.

The laser output controller 108 controls the output from the semiconductor laser 102 based on the output signal from the photodiode 104. The temperature adjustment controller 109 controls the temperature adjustment operation of the temperature adjustment unit 107 based on the output signal from the photodiode 105.

An example of the operation of the optical module according to the exemplary embodiment will be explained next. First, the directional coupler makes a predetermined ratio of an optical signal (laser beam) emitted by the semiconductor laser 102 enter the input waveguide 111. Out of the optical signal incident on the input waveguide 111, a component having a wavelength which resonates with the ring resonator 103 passes through the ring resonator 103 and is coupled with the output waveguide 112. The component is guided through the output waveguide 112 and input to the semiconductor Mach-Zehnder modulator 106. The ring resonator 103 has a periodical wavelength dependence for transmission and non-transmission and functions as a wavelength locker, like an etalon filter.

On the other hand, the optical signal that enters the branch waveguide 113 by the directional coupler is guided through the branch waveguide 113 and enters the photodiode 104. As a result, the photodiode 104 outputs an electrical signal corresponding to the incident optical signal. The optical signal entering the photodiode 104 reflects a change in the optical signal output from the semiconductor laser 102. Hence, the electrical signal output from the photodiode 104 as described above also reflects the change in the optical signal output from the semiconductor laser 102. While the photodiode 104 is outputting the electrical signal, the laser output controller 108 controls the laser output of the semiconductor laser 102 to make the output electrical signal constant.

The optical signal which has entered the input waveguide 111 but not passed through the ring resonator 103 is guided toward the through port and output from the output terminal to the photodiode 105. As a result, the photodiode 105 outputs an electrical signal corresponding to the incident optical signal. An optical signal other than the wavelength to be output from the optical module enters the photodiode 105. Hence, the electrical signal output from the photodiode 105 reflects the light intensity of the component other than the desired wavelength out of the optical signal output from the semiconductor laser 102.

While the photodiode 105 is thus outputting the electrical signal, the temperature adjustment controller 109 controls the temperature adjustment operation of the temperature adjustment unit 107 to make the output electrical signal constant. For example, control is done to always minimize the output electrical signal. The output wavelength of the semiconductor laser 102 varies depending on the temperature. However, the temperature adjustment unit 107 is controlled in the above-described way to perform temperature adjustment and control the temperature of the semiconductor laser 102 so that its output wavelength is controlled to a desired predetermined value.

With the above-described operation, the signal light having the controlled output intensity and wavelength passes through the ring resonator 103. After that, the signal light undergoes light intensity modulation by the semiconductor Mach-Zehnder modulator 106 and is then output.

In the optical module according to the above-described exemplary embodiment, first, the optical signal output from the semiconductor laser 102 is directly coupled with the input waveguide 111. The optical signal passed through the ring resonator 103 and output from the output side of the output waveguide 112 is directly coupled with the semiconductor Mach-Zehnder modulator 106. This decreases the coupling loss as compared to an arrangement using a lens system.

The ring resonator 103 selectively passes an optical signal having a frequency corresponding to the optical signal to be modulated and output from the semiconductor Mach-Zehnder modulator 106. It is therefore unnecessary to control to maximize the optical signal strength to be detected by the photodiode 105. This enables to further increase the strength of the optical signal that should pass through the ring resonator 103.

In the optical module according to this exemplary embodiment, the temperature adjustment unit 107 controls the temperature of the entire waveguide unit 101 to control the oscillation wavelength of the semiconductor laser 102. For this reason, the temperature control state affects the semiconductor Mach-Zehnder modulator 106 as well. However, since the semiconductor Mach-Zehnder modulator 106 can correct variations in its characteristics by, e.g. DC bias control, a desired modulation operation can be performed even if the temperature varies upon the above-described temperature control. Note that using an array type laser element including a plurality of semiconductor lasers with different oscillation wavelengths in place of the single semiconductor laser 102 allows to widen the wavelength variable range.

Figure 2:
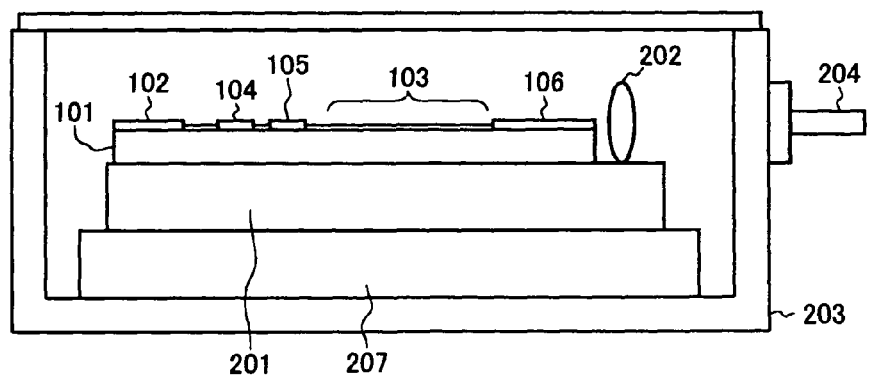
FIG. 2 is a view schematically showing the sectional structure of the optical module shown in FIG. 1.

A more detailed example of the arrangement of the optical module will be described next. In the optical module, a metal mount 201 is arranged on a Peltier module 207, and the waveguide unit 101 is fixed on the mount 201, as shown in FIG. 2. The mount 201 need only be made of, e.g., a CuTa alloy or Kovar. Note that the Peltier module 207 is formed from a well-known Peltier element and corresponds to the temperature adjustment unit 107.

The Peltier module 207, the mount 201, and the waveguide unit 101 are accommodated (mounted) in a hermetically sealed package 203. In the waveguide unit 101, a condenser lens 202 is arranged on the optical signal output side of the semiconductor Mach-Zehnder modulator 106 so as to couple the optical signal with an optical fiber 204 extracted outside the package 203. Note that the laser output controller 108 and the temperature adjustment controller 109 can be either accommodated in the package 203 or provided outside the package 203.

Figure 3A:
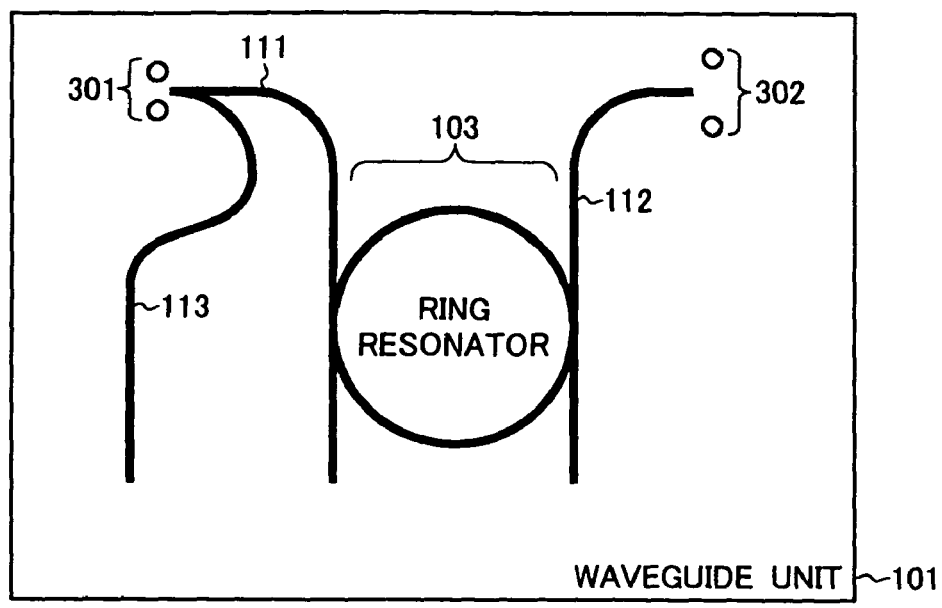
FIGS. 3A to 3C are views showing main steps in the manufacture of the optical module shown in FIG. 1.

A method of manufacturing the optical module according to this exemplary embodiment will briefly be described next. First, as shown in FIG. 3A, the above-described waveguides and the ring resonator 103 are formed on the waveguide unit 101. At this time, patterns 301 and 302 for alignment are also formed. The pattern 301 serves as an alignment mark to install (mount) the semiconductor laser 102 at a high accuracy of position. The pattern 302 serves as an alignment mark to install the semiconductor Mach-Zehnder modulator at a high accuracy of position.

Figure 3B:
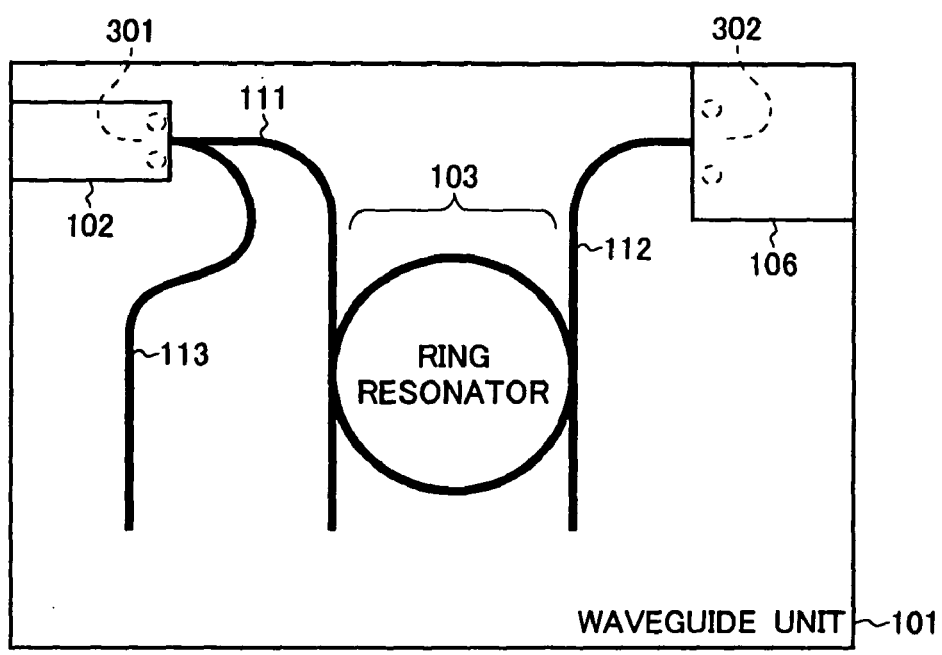

Next, as shown in FIG. 3B, the semiconductor laser 102 and the semiconductor Mach-Zehnder modulator 106 are mounted on the waveguide unit 101. In this mounting, first, the semiconductor laser 102 is aligned based on the pattern 301. The semiconductor laser 102 is mounted by, for example, aligning an alignment mark formed on the semiconductor laser 102 with the position of the pattern 301. The semiconductor Mach-Zehnder modulator 106 is aligned based on the pattern 302. The semiconductor Mach-Zehnder modulator 106 is mounted by, for example, aligning an alignment mark formed on the semiconductor Mach-Zehnder modulator 106 with the position of the pattern 302. The mounting by alignment is done using an image recognition method disclosed in, e.g., Japanese Patent Laid-Open No. 2000-231041 (reference 6). Alternatively, they may be mounted at a high accuracy of position by self alignment using a positioning stage, as disclosed in Japanese Patent Laid-Open No. 07-235566 (reference 7).

Figure 3C:
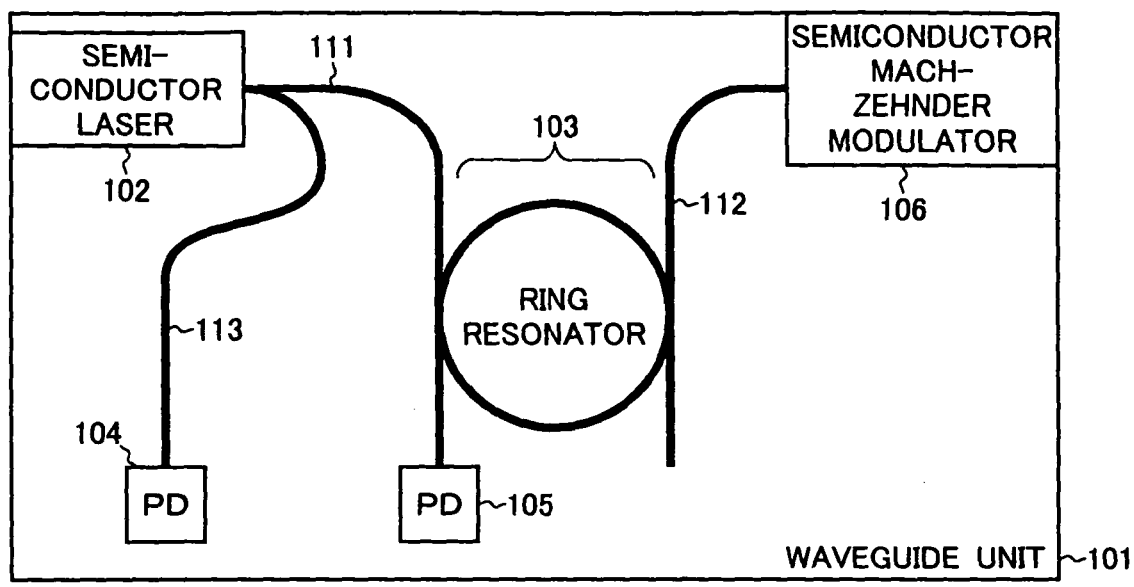

Then, as shown in FIG. 3C, the photodiode 104 to be connected to the output terminal of the branch waveguide 113 and the photodiode 105 to be connected to the output terminal of the through port of the input waveguide 111 are mounted on the waveguide unit 101. Since the photodiodes 104 and 105 do not require a high accuracy of position for mounting, alignment using the above-described alignment marks is unnecessary.

After the waveguide unit 101 is completed in the above-described way, the waveguide unit 101 is fixed on the mount 201 together with the lens 202, as shown in FIG. 2. These components are then placed on the Peltier module 207 and mounted in the package 203.

As described above, according to this exemplary embodiment, the semiconductor laser 102 and the semiconductor Mach-Zehnder modulator 106 are connected to the wavelength filter having a ring resonator structure including a waveguide formed on the waveguide unit 101, thereby forming an optical module. It is therefore possible to obtain an excellent effect of stably outputting an optical signal having a higher strength in a low coupling loss state.

The optical module of this exemplary embodiment is applicable to an optical transmission module used in a ROADM (Reconfigurable Optical Add/Drop Multiplexer) system or the like.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An optical module comprising:
a waveguide unit including an input waveguide, a circular waveguide, an output waveguide, and a branch waveguide branched from an input terminal of the input waveguide, the input waveguide, the circular waveguide, and the output waveguide forming a wavelength filter having a ring resonator structure;
a semiconductor laser mounted on said waveguide unit and connected to the input terminal of the input waveguide;
a semiconductor Mach-Zehnder modulator mounted on said waveguide unit and connected to an output terminal of the output waveguide;
a first photodiode mounted on said waveguide unit and connected to an output terminal of the branch waveguide;
a second photodiode mounted on said waveguide unit and connected to a through port of the input waveguide;
a temperature adjustment unit which adjusts a temperature of said waveguide unit;
a laser output controller which is connected to said first photodiode and said semiconductor laser to control an output from said semiconductor laser based on an output signal from said first photodiode; and
a temperature adjustment controller which is connected to said second photodiode and said temperature adjustment unit to control a temperature adjustment operation of said temperature adjustment unit based on an output signal from said second photodiode.

2. A module according to claim 1, wherein each of the input waveguide, the circular waveguide, the output waveguide, and the branch waveguide is formed from a silicon core.

3. A module according to claim 1, wherein
said temperature adjustment unit comprises a Peltier element, and
said waveguide unit is arranged on said temperature adjustment unit via a mount made of a metal material.

4. A module according to claim 1, wherein said waveguide unit further comprises marks serving as references for alignment of said semiconductor laser and said semiconductor Mach-Zehnder modulator.

5. A module according to claim 4, wherein said semiconductor laser and said semiconductor Mach-Zehnder modulator are mounted while being aligned with the marks.

6. A module according to claim 1, wherein the input waveguide is connected to the output waveguide via the circular waveguide.

7. An optical module comprising:
a waveguide unit including an input waveguide, a circular waveguide, an output waveguide, and a branch waveguide branched from an input terminal of the input waveguide, the input waveguide, the circular waveguide, and the output waveguide forming a wavelength filter having a ring resonator structure;
a semiconductor laser mounted on said waveguide unit and connected to the input terminal of the input waveguide;
a semiconductor Mach-Zehnder modulator mounted on said waveguide unit and connected to an output terminal of the output waveguide;
a first photodiode mounted on said waveguide unit and connected to an output terminal of the branch waveguide;
a second photodiode mounted on said waveguide unit and connected to a through port of the input waveguide;
a temperature adjustment unit which adjusts a temperature of said waveguide unit;
laser output control means for controlling an output from said semiconductor laser based on an output signal from said first photodiode; and
temperature adjustment control means for controlling a temperature adjustment operation of said temperature adjustment unit based on an output signal from said second photodiode.

* * * * *